United States Patent [19]

Baltzer et al.

[11] Patent Number: 4,538,229
[45] Date of Patent: Aug. 27, 1985

[54] SYSTEM FOR PREPARING AIRCRAFT DRIFTDOWN PLANS

[75] Inventors: Karen L. Baltzer, Minneapolis; Jan B. Peterson, Burnsville, both of Minn.

[73] Assignee: Kavouras, Inc., Minneapolis, Minn.

[21] Appl. No.: 474,149

[22] Filed: Mar. 10, 1983

[51] Int. Cl.³ .............................................. G06F 15/50
[52] U.S. Cl. .................................. 364/428; 343/5 LS; 340/963; 73/178 T
[58] Field of Search ............... 364/428, 433, 443, 444, 364/448, 449, 460; 343/5 LS, 5 MM; 340/963, 970, 977; 73/178 R, 178 T

[56] References Cited

U.S. PATENT DOCUMENTS

| | | | |
|---|---|---|---|
| 3,786,505 | 1/1974 | Rennie | 343/5 LS |
| 4,086,632 | 4/1978 | Lions | 364/448 |
| 4,144,571 | 3/1979 | Webber | 343/5 MM |
| 4,224,669 | 9/1980 | Brame | 364/433 |
| 4,495,580 | 1/1985 | Keearns | 343/5 MM |

Primary Examiner—Gary Chin
Attorney, Agent, or Firm—Orrin M. Haugen; Thomas J. Nikolai; Douglas L. Tschida

[57] ABSTRACT

A computerized system for examining single engine performance capabilities and developing alternate routes/routings for two-engine aircraft in compliance with FAR 121.19 (driftdown, one engine inoperative) such that an attendant loss of altitude will not result in the aircraft dropping below a net flight path altitude and clearance distance with respect to the earth's surface along a given route between a flight originating point and a destination. Included as a part of the computation are the radius of action fuel capabilities which takes into consideration the "maximum continuous thrust", the power demands on the remaining engine, air density-temperature change attendant with altitude loss, and real time wind conditions.

4 Claims, 6 Drawing Figures

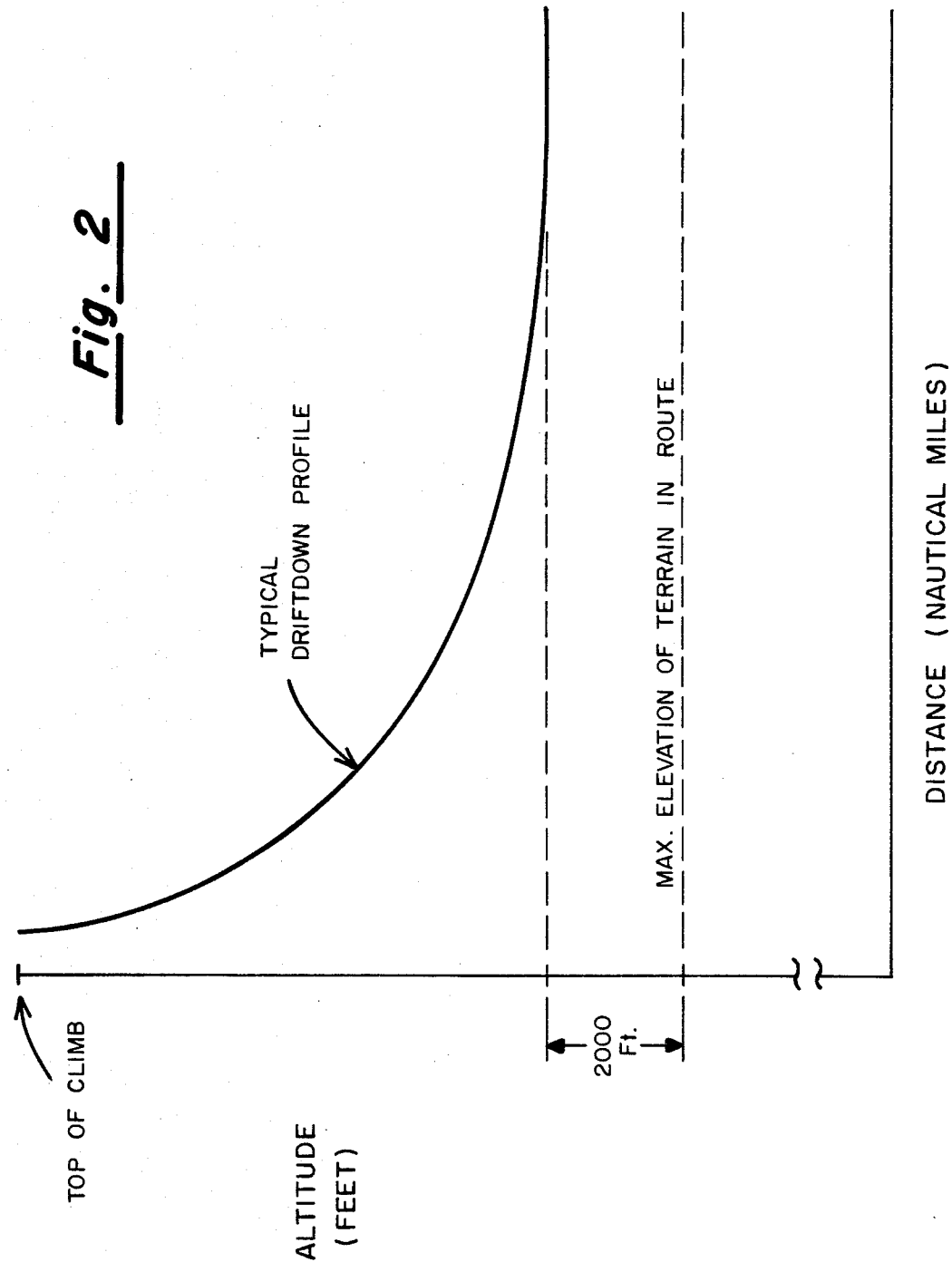

SYSTEM FOR PREPARING AIRCRAFT DRIFTDOWN PLANS

BACKGROUND OF THE INVENTION

This invention relates generally to a flight safety system, and more particularly to an improved method for computing driftdown plans for use by commercial, private or military aircraft flight personal.

Government aircraft regulations require that commercial airlines, using multi-engine aircraft, have available for immediate emergency use, a plan whereby, upon loss of an engine anywhere along a planned route, altnernate landing sites, other than the planned destination, are specified where the loss in altitude due to engine failure (driftdown) will not result in the aircraft dropping below a minimum safe elevation relative to the earth's surface as it exists in the route of travel. In the past, it has been the practice of the airlines to manually generate a so-called driftdown plan using data supplied by the aircraft manufacturer relating to the aircraft's performance. Typically, based upon the information contained in so-called "burn tables" and "driftdown curve tables" for each manufacturer's engine type and with the aid of a terrian elevation map, a driftdown plan was prepared for each leg of an authorized route.

This rather time consuming process has proven to be much less than satisfactory in that it does not properly take into account certain real-time parameters which could effect the results of the determination as to whether a planned alternate landing site, would, in fact, be acceptable. For example, wind and weather conditions cannot accurately be predicted much in advance of a scheduled departure time. As a result, driftdown plans which may be prepared many months in advance of any expected use and which are maintained in a manual on board the aircraft, ignored such conditions. Thus, to ensure safety irrespective of weather or wind or other variable conditions, the prior art driftdown plans imposed stringent limitations on load factors such that the airlines have been unable to effectively utilize the seating capacity of the aircraft. This, of course results in a loss in passenger revenues.

Occasions also arise where, depending upon how much air traffic is around, a FAA Flight Controller may direct a course between a city of origin and a destination which is different from the airline's usual route between those cities. When a different route is involved, personal on board the aircraft may not have available in its canned set of driftdown plans a plan which would cover this alternate course. Furthermore, unscheduled flights, such as charter flights, may be routed from an origin to a destination so as to cover a flight path for which the charter airline may not have previously generated or obtained a driftdown plan. Then too, whenever a commercial airline desires to get a new route approved, the airline must provide the FAA with detailed driftdown plans, which plans, of course, must be revised to the extent that the FAA specifies the routing which may differ that being requested. The need to prepare and revise the driftdown plans using manual methods is not only time consuming but costly as well.

The system of the present invention obviates, for the most part, all of the drawbacks and disadvantages of the prior art methods alluded to above. Employing a general purpose digital computer containing an appropriate data base and programmed in a fashion set forth in detail hereinbelow, persons desiring a driftdown plan can obtain same in a matter of moments, the plan taking into account standard and nonstandard routes, weather conditions, traffic loads, etc. Knowing a planned flight path in terms of the latitude and longitude of the vectoring points along the route, and knowing the fuel on board, the altitude at the top of climb point, the weight of the aircraft at the top of climb, and by combining these data with "worst case" international standard atmospheric (ISA) temperatures and aircraft/engine "worst case" bleed air configurations, the computer is able to project whether an aircraft, losing an engine would be able to drift down to its planned destination while still clearing all terrain on 10 miles either side of the flight path by at least 2000 feet. Where it is determined that the aircraft cannot sustain a sufficiently high altitude to clear all terrian by 2000 feet vertically in attempting to reach its scheduled destination upon the loss of an engine, the computerized system of the present invention will automatically determine what alternate landing sites would be available. The alternate sites may either be automatically determined by the computer or the operator may propose an alternate site and have the system of the present invention determine whether that site is a viable alternative. In either instance, the test is whether there is any limiting terrain within ten miles of either side of the flight path leading to that alternate desitnation. Also, at the time that an alternate is designated, wind conditions, (both velocity and direction), remaining fuel and other factors are taken into account in determining the ability of the aircraft to reach that alternative landing site should an engine fail.

The computer system of the present invention operates on an iterative cycle at predetermined increments of distance along the flight path, typically every 10 miles. That is to say, at 10 mile increments along the scheduled route a determination is made whether the aircraft could drift down, upon the loss of an engine, to its planned destination and if not, whether it can make it back to its origin or to some other operators specified or computed alternate landing site. In addition, the system of the present invention provides a printout at each decision point of its longitude and latitude, the weight of the aircraft, the amount of fuel remaining, the distance and heading to the alternate and the approximate altitude that the aircraft will be at the alternate, considering the driftdown accompanying the loss of an engine.

OBJECTS

It is accordingly a principal object of the present invention to provide an automated method of producing driftdown plans for aircraft.

It is another object of the invention to provide a computer system programmed to produce printed reports indicating the ability of an aircraft to reach a predetermined destination and to specify alternate landing sites such that an aircraft losing altitude beacuse of a failure of an engine, will still maintain a predetermined safe elevation relative to the terrian over which the aircraft must pass in reaching either the scheduled destination or the alternate landing site.

These and other objects and advantages of the invention will become apparent to those skilled in the art from the following detailed description of the preferred embodiment when considered in light of the accompanying drawings.

DESCRIPTION OF THE DRAWINGS

FIG. 2 illustrates a typical driftdown curve for a two engine aircraft, plotting decrease in altitude v distance traveled;

DESCRIPTION OF THE PREFERRED EMBODIMENT

Figure 1:
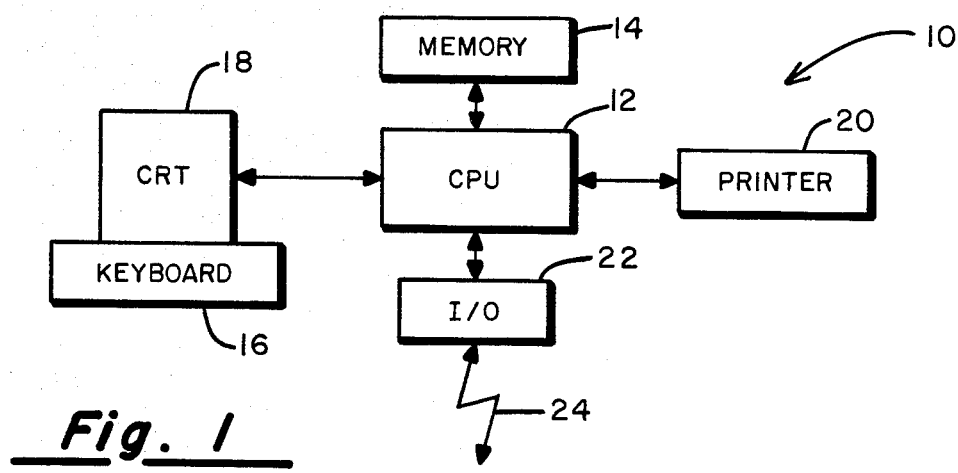
FIG. 1 is a general block diagram of a computer system which may be programmed to perform the method of the present invention.

Referring to FIG. 1, there is shown a block diagram of a general purpose digital computer useful in carrying out the method of the present invention. The computer system 10 includes a central processing unit (CPU) 12 which includes conventional circuitry for performing data processing functions in accordance with a program of instructions, such as may be stored in a memory unit 14. Also stored at addressable locations within the memory unit 14 are operands forming one or more data bases. These operands are transferred, under program control, to and from the CPU 12. To provide operator communication with the system, it may include one or more terminal devices, here shown as keyboard 16 and a CRT display 18. Hard copy of information generated during program execution can be obtained from a printer mechanism 20.

As is well known in the digital data processing art, a communications I/O interface may be provided as at 22 which allows operators at remote terminals (not shown) to communicate with the computer system, either over dedicated communications links or over voice grade channels, such as telephone lines 24.

While various commercially available digital computing systems may be employed, it has been found expedient to use a Data General Model MV8000 computer system having 4 megabytes of internal memory as well as suitable mass storage auxiliary memory. Such a system is capable of operating at rates compatible with the on-line requirements dictated by the method of the present invention.

Before explaining the algorithm involved in preparing aircraft driftdown plans in accordance with the method of the present invention, the nature of the data bases stored in the memory 14 will be explained.

A first data base contained within the memory 14 is the so-called terrain information. Working with terrian maps available from the National Oceanic and Geodetic Survey, a predetermined small area or territory is identified by longitude and latitude parameters, the territory comprising a predetermined area. Associated with the longitude and latitude, then, is an elevation figure for the highest point within that area. Typically, the longitude and latitude parameters of a given coordiante location comprises a number having a integer and a decimal value. The two integer values, one corresponding to longitude and the other corresponding to latitude can then be used to address an area with the decimal portion of the longitude and latitude thereof defining a precise point within the overall area. The altitude data obtained from the maps are then stored in the terrain database at addresses corresponding to the longitude and latitude figures. Subsequently, when it is desired to determine the elevation of the terrain at a given point, one need only provide the coordinates for that point and the computer will generate a record number based upon the given information so as to read out from the address the appropriate elevation information.

Also stored in the memory as a further data base is aircraft performance data. Using Aircraft Manufacturers' Planning and Performance Data, the driftdown characteristics of each particular aircraft and engine type used on that aircraft may be entered into the computer's memory. Typically, the driftdown performance characteristics are contained in so-called "Burn Tables". The Burn Tables comprise a tabular presentation of altitude and instantaneous weight as a function of driftdown distance, usually plotted for 10 nautical mile increments. Based upon these data, the fuel being consumed can be interpolated by a simple subtraction operation in that changes in instantaneous weight are due solely to fuel consumption. Fuel consumption is a function of altitude, temperature, engine pressure ratio (EPR) and mach number, which is the ratio of aircraft speed to the speed of sound. Thus, for each engine type on a given aircraft, the driftdown curve tables provide raw data pertaining to instantaneous weight, the time in descent, fuel consumed, and the height of the aircraft relative to sea level. The pounds of fuel consumed per nautical mile is a function of weight, altitude, speed and is essentially independent of temperature in that an engine's fuel consumption for given values of thrust, altitude and mach number increases with temperature at approximately the same rate as the speed of sound.

FIG. 2 depicts a typical driftdown profile of a two engine aircraft such as the Douglas DC-9 upon the loss of an engine. Initially, the decent is quite steep in that at the higher altitudes, the air is thinner, and the aircraft is heavier due to its fuel load. However, as time in flight progresses, more fuel is consumed and the air becomes more dense at the lower altitude. As such, even with one engine out, a point is reached where the aircraft is able to maintain its altitude at some predetermined level. With this in mind, then, the driftdown plan must establish whether an aircraft, following this profile, would clear all terrain along a given flight path and on ten miles each side thereof by at least some predetermined safe clearance distance, such as 2000 ft., in reaching its scheduled destination. If not, the system of the present invention can either select an alternate landing site or advise flight personal whether a designated alternate site would be acceptable, i.e., whether the aircraft could reach that alternate site while still clearing all terrian from the point at which an engine fails to that alternate destination by the 2000 ft safety margins.

Figure 3:
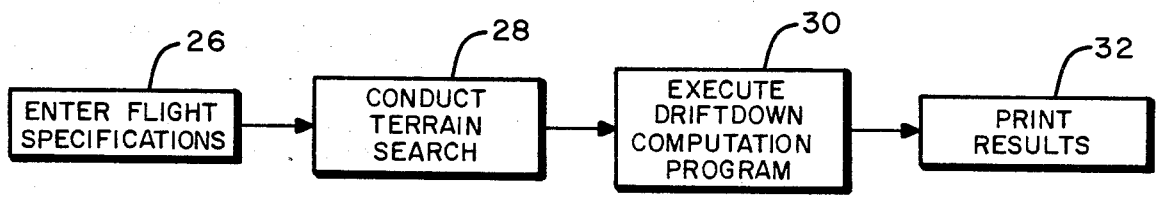
FIG. 3 is a generalized flow chart helpful in understanding the organization of the system of the present inventions.

With reference to FIG. 3, the creation of a driftdown plan is intitiated when a computer operator enters the flight specifications into the computer via the keyboard 16. This operation is represented by block 26 in FIG. 3. Typically, the flight specifications include route information, the aircraft engine type, the planned cruising altitude, the weight of the aircraft at the top of climb, the distance between the originating air field and the top of climb and, finally, the number of pounds of fuel remaining at the top of the climb point. The flight route may be specified by the industry-standardized, 3-letter city designators for the origin and destination of each leg of a flight. Once these route designators are entered into the computer, the computer takes over to calculate the distance and heading between the designated points along the route. In addition, once the cruise altitude, the weight of the aircraft at the top of climb, the distance to the top of climb and the pounds of fuel remaining at the top of climb are known, the range capability of the aircraft can be computed.

With continued reference to FIG. 3, upon entry of the foregoing flight specification data into the CPU 12 via the keyboard 16, the computer is programmed to perform a terrain search operation. This operation is represented in the block diagram of FIG. 3 by block 28. In doing so, the profile of the driftdown curve of FIG. 2 is compared with the highest terrain elevation to be encountered in route and within 10 miles on either side of the flight path so as to determine whether a predetermined mimimum safe clearance of, say, 2000 ft. can be maintained. In doing so, the computer generates addresses from the longitude and latitude data so as to access the elevation information for points along the route from the first data base previously stored in the memory 14 of the computer system. If no limiting terrain is encountered, a "clear-to-destination" indication or message is provided either on the CRT 18 or, if desired, at the printer 20.

However, if the terrain search operation reveals that an aircraft losing an engine cannot maintain a suffuciently high altitude so as to clear all terrain in the planned flight route by the 2000 ft. margin, the computer system begins executing the driftdown computation program as indicated by block 30 in FIG. 3. Once the driftdown computation program has been executed, the results thereof are provided in hard copy at the printer 20, the operation being represented by block 32 in the flow diagram of FIG. 3.

Figure 4A:
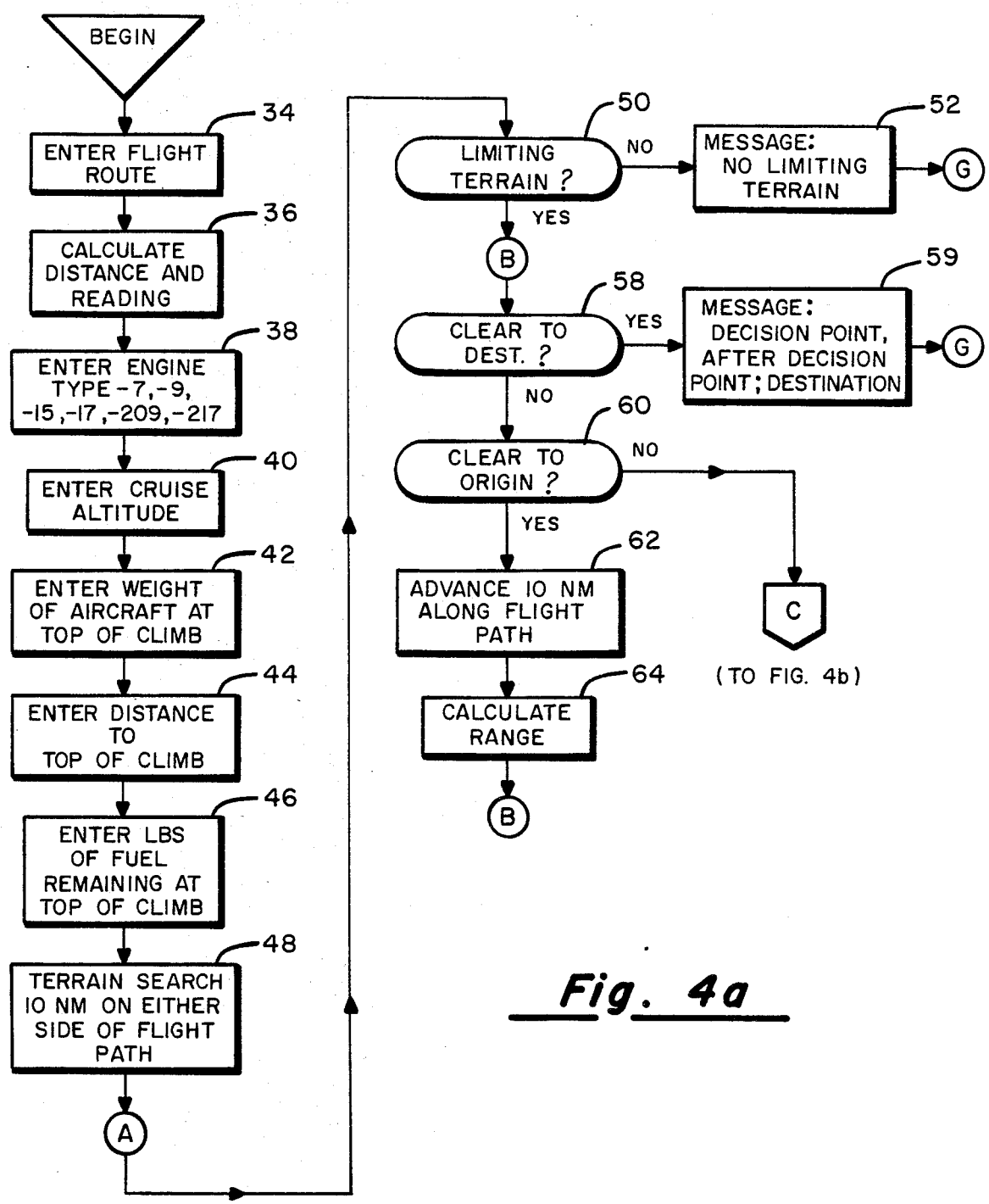
FIGS. 4a and 4b together comprise a detailed flow chart of the software for practicing the present invention.
Figure 4B:
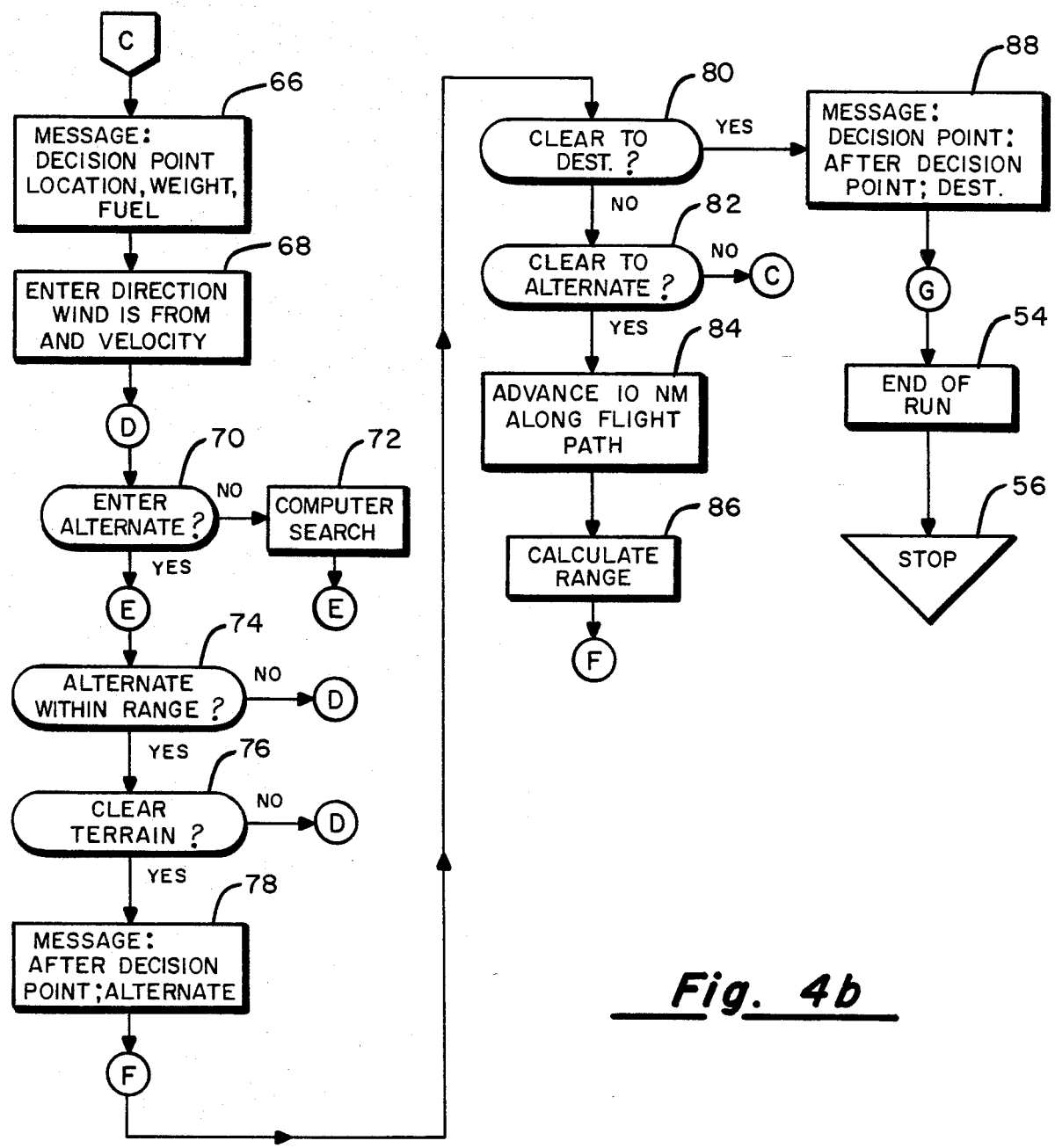

Now that the general organization of the system of the present invention has been provided, a detailed explanation of the program will be provided and, in this regard, reference will be had to the programming flow diagram of FIGS. 4a and 4b. Those skilled in the art of programming a general purpose digital computer will be able to generate the detailed machine coding necessary to have the computer execute the operations reflected in the flow diagram of FIG. 4. Naturally, the machine coding of the program will vary, depending upon the computer employed, and, hence, it is not deemed necessary for a full understanding of the invention to provide listings reflecting the detailed coding.

Referring to FIG. 4(a) as indicated by operation block 34, the program begins with the entry of the flight route information. As mentioned previously, the 3-letter city designator for the origin and each scheduled landing site for a proposed flight is entered by the operator via the keyboard entry device 16. The system is programmed such that the entry of a 3-letter city code will access from the computers memory the spherical coordinates for that city. As is indicated by block 36, once the spherical coordinates for the origination of the flight and the scheduled landing sites are known, the computer is programmed to perform arithmetic computations, using spherical trigonometry, to calculate the distance in nautical miles between the origin and first destination point as well as the heading that the aircraft must assume to reach that destination. The results of these computations is printed out as a part of the driftdown plan.

Next, via the keyboard 16, the operator enters the engine type as indicated by block 38. Considering the DC-9 aircraft manufactured by the Douglas Aircraft Corporation, there are six different engine types commonly used and they are referred to by the dash numbers listed in block 38 of FIG. 4(a). Each of these engine types, when used with that aircraft, provide a different driftdown curve of the type shown in FIG. 2 of the drawings. As has already been mentioned, the driftdown data reflected by the curves for each of the available engine types is prestored in the computer as a second data base. By entering in one of the six possible dash numbers, the computer automatically selects the appropriate data from that second data base for that aircraft and engine.

As is indicated by block 40, the operator next enters the planned cruising altitude specified by the FAA for the particular flight in question. Next, the operator enters a number representing, in pounds, the weight of the aircraft at the point where it just reaches its cruise altitude, i.e., at its top of climb. The load factor for each flight is known prior to departure when the driftdown computations are made. That is, shortly before the scheduled departure time, the airline knowns the passenger count, the quantity of fuel on board as well as any other variable factors effecting the weight of the aircraft. In fact, one of the important advantages of the present invention is the ability to determine whether the number of passengers must be reduced in order to assure a safe driftdown profile along the route. Without the aid of the present invention, it was often necessary for an airline to fly an aircraft at less than full capacity to provide a desired margin of safety. By using the system of the present invention, however, revenue generating passengers need not be left at the gate on an arbitrary basis.

The entry of the flight specification also includes the entry of the distance from the originating airport to the point at which the aircraft reaches its cruising altitude, this operation being indicated by block 44 in FIG. 4(a). The distance to the top of climb is specified by the Federal Aviation Agency (FAA) upon route approval or by the Flight Controller in the case of private or military aircraft. As a final item of the flight specification, the operator enters a number corresponding to the weight in pounds of the fuel remaining at the top of climb point. This factor is generally determined by the airlines in advance so as to comply with FAA regulations.

Once the foregoing flight specification data has been entered into the computer, the computer takes over to perform the terrain search operation as indicated by block 48 in FIG. 4a. As has already been explained, a comparison is made between the driftdown curve characteristics for the particular aircraft and engine type selected (block 38) and knowing the flight heading as previously computed (block 36), the computer is made to perform a series of arithmetic operations to determine whether the height of the terrain which will be encountered within a band ten nautical miles wide on either side of the flight path will fall within a predetermined clearance distance of the bottom of the driftdown curve characteristic (See FIG. 2). As is reflected by Block 50, a decision is made as to whether there is any limiting terrain as determined during the terrain search operation. If the test reveals no such limiting terrain, a message to that effect is printed out as represented by box 52 and the program exits at connector G to indicate the End of Run (block 54) and Stop (block 56).

Where the terrain search reveals the existence of limiting terrain along the route, the program exits to connector point B which is an input to a second decision block 58. Here, at the top of climb, a determination is made whether the aircraft can clear the highest terrain all the way to the destination in the event of the loss of one engine. If so, the printer 20 types out a message indicating the coordinates of the decision point and that after the decision point the scheduled destination city is identified. Then, the program again exits as indicated by connector G and that particular computation run ceases.

If at decision block 58 it is determined that the aircraft will be unable to reach its scheduled destination without encountering limiting terrain, a test is made to determine whether the aircraft can make it back to the city where the particular flight leg originated. This test is reflected by the decision block 60 labeled "Clear to Origin?". Assuming that the aircraft is still sufficiently close to its point of origin that there is no limiting terrain between its current position and the city of origin, and that this city is not rendered unacceptable for landing because of weather conditions, the computer next determines the situation as it would exist ten nautical miles further along the flight path. This operation is represented by block 62 in FIG. 4(a). Here, the range of the aircraft is computed based on the information contained in the second data base, i.e., the "burn tables". Based upon factors such as the aircraft weight, its altitude, its air speed, the fuel remaining and possibly other parameters, the distance the aircraft can travel while still meeting the minimum requirements specified by the FAA is computed. As reflected by the Block 64 in the flow diagram, following this range computation the program loops back and re-enters decision block 58. It can be seen that the computer performs the driftdown computation on an iterative basis at each ten nautical mile increment along the flight path until a determination is made at decision block 60 that the aircraft can no longer make it back to its origin. The location along the flight path where a determination is made that the aircraft can no longer make it back to the city it took off from is referred to herein as the "first decision point." The program then exits to conector C and the computer is made to print out the longitude and latitude coordinates of the first decision point, the number of nautical miles along the route of that decision point, the weight of the aircraft at that decision point and the weight of the fuel remaining. This operation is reflected by operation block 66 in the flow diagram of FIG. 4(b). When a decision point is thus determined, the operator enters wind information via the keyboard entry device 16. As is indicated by the flow diagram block 68, both the wind direction and its velocity are entered. This data is obtained hourly from the National Weather Service so that the driftdown plan can be maintained at least that current.

Following that, a "prompt" is displayed on the face of the CRT 18 asking the operator if he or she wishes to make a selection of a proposed alternate site at which the aircraft might land. If so, the operator types in the three-letter city designator of a proposed alternate landing site. On the other hand, if the operator elects not to specify an alternate site, the computer performs a search to locate an alternative landing location which is within range and which will involve a flight path clearing all terrain by the minumum safe distance of, for example, 2000 ft. As is shown in the flow diagram, this is accomplished by the fact that the computer search operation (block 72) and the decision blocks 74 and 76 each loop back to the entry point of the decision block 70 where the operator is allowed to elect or suggest to the system a proposed alternate landing site. it is readily apparent that the program will continue to loop in this fashion until an alternate is found which is not only within range (decision block 74) but which will allow the aircraft to driftdown from that decision point to the alternate destination while continuing to clear the highest terrain to be encountered ten miles either side of a path from the decision point to the proposed alternate site. Once such a location is found, the computer causes the printer to type out the identification of the alternate landing site, its distance from the decision point, and the heading in degress that the aircraft must fly to reach that alternate destination. It also will indicate the weight of the aircraft, the amount of fuel remaining and the altitude to which the aircraft will have drifted down upon reaching the alternate destination. This message is reflected in the block diagram by block 78.

With continued reference to FIG. 4(b), following the indication of an acceptable alternate, the computer next performs a test to determine whether the terrain can be cleared on to the scheduled destination for the flight. This test is indicated in the flow diagram by decision block 80. If the test reveals the bottom of the driftdown curve does not come within a predetermined distance of the highest elevation encountered between the decision point and the destination, a message is printed indicating that after passing the current decision point, the location for landing in the event of the loss of an engine is to be the city scheduled to be the flights destination. However, if as a result of the test indicated by block 80 is that the aircraft would not be able to driftdown from the decision point to the planned destination, a further test 82 is made to locate yet another alternate landing site. Assuming that the previously determined alternate is acceptable, the computer assumes the loss of an engine at a point ten nautical miles further along the flight path (See block 84). Again, the range of the aircraft is computed at that new location, the range being determined by wind conditions, weight considerations, the amount of fuel remaining and the engine/aircraft performance characteristics. This operation is represented in the flow diagram by block 86. The program then loops back to the input of decision block 80 with the sequence being repeated until such time that, in the event of the loss of an engine, the aircraft cannot drift down to its destination nor to its previously identified alternate landing site. In that event, the program jumps to operation block 66 where the location of the new decision point is printed out and another alternate landing site determined, all as has previously been explained.

A point will be reached after a number of iterative cycles where the aircraft will be able to drift down to its scheduled destination point and at this stage the printer will provide a message identifying that decision point. See operation block 88. Once the information concerning the final decision point has been printed, operation exists from the block 88 to the input of block 54 which terminates the running of the program.

Figure 5:
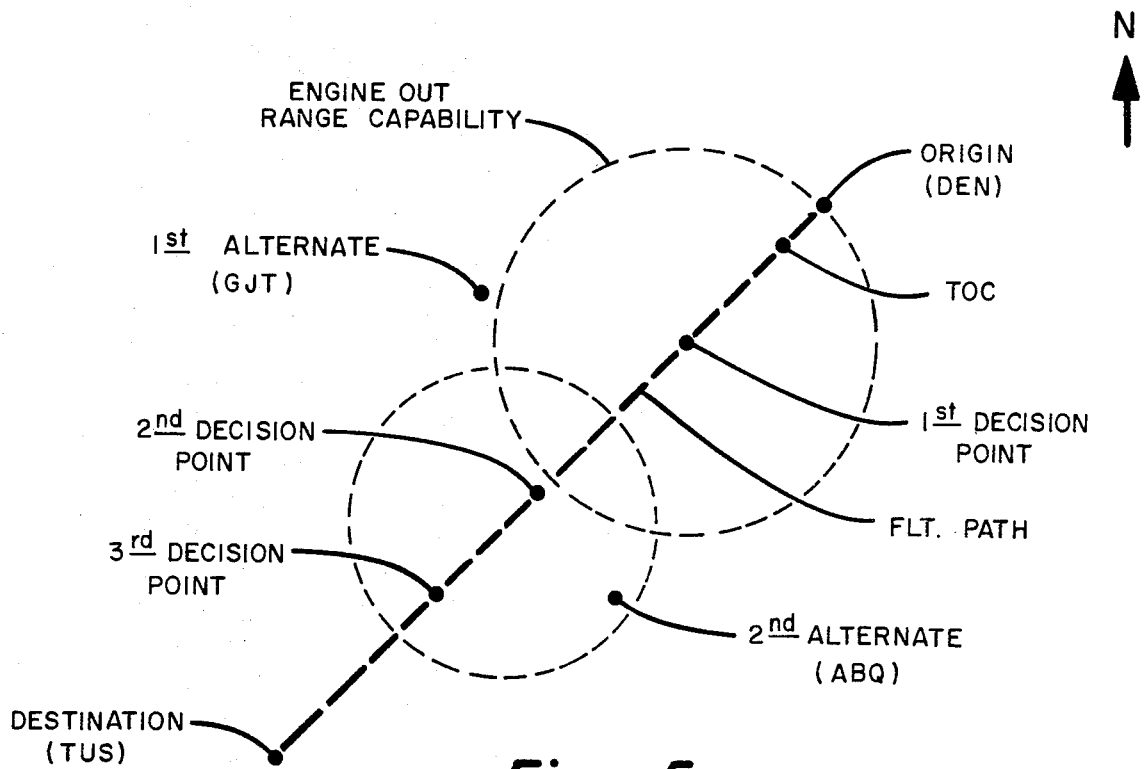
FIG. 5 is a graphical presentation of a typical flight helpful in understanding the invention.

To more clearly understand the operation of the system of the present invention, let it be assumed that a flight originating at Denver, Colo. and scheduled to land in Tuscon, Ariz. desires to have a driftdown plan generated for it. FIG. 5 illustrates a schematically proposed route from the origin (DEN) to the destination (TUS). This route, of course, must cross over a portion of several mountain ranges.

In preparing the driftdown plan, the operator first enters the flight route via the keyboard entry device 16 of FIG. 1. By typing in the three letter city code (DEN) for the origin and the code (TUS) for the destination, the computer takes over to cause a print out of the coordinate locations of each of these cities and to calculate the distance in nautical miles (557.015) between them. It also computes the heading the aircraft must follow in traversing this route (218.412°). Once the type number of the engine, the cruise altitude for the flight, the weight at top of climb, the distance to the top of climb and the fuel remaining at the top of climb are entered, a first decision point can be computed. The computer causes the printer to generate a report identifying the location of that decision point in terms of its longitude and latitude and in terms of the distance along the route from the point of origin, Denver. If an engine should fail prior to the decision point, the driftdown plan indicates that the course of action to be followed is for the pilot to return to Denver. After the first decision point has been passed, however, the computer identifies Grand Junction, Colo. (GJT) as an alternate landing sight in the event of a loss of power to an engine. The printer generate a report indicating the distance from that decision point to the alternate landing site, the heading to be followed so as to reach that alternate landing site, the weight of the aircraft upon reaching the alternate site, the amount of fuel remaining as well as the altitude that the aircraft would be at at the time of reaching the alternate landing site.

As has already been indicated, the computer takes over to again continually move out along the flight route in ten nautical mile increments and at each such increment, to determine whether the aircraft would still be able to reach the previously determined alternate site in the event of the loss of an engine. When the point is reached when the aircraft can no longer drift down to Grand Junction while safely maintaining an altitude at least 2000 ft. above the highest terrain in a ten mile zone on each side of the flight path, it identifies that location as the second decision point. Again, a record is made indicating the coordinate location of that second decision point, its distance from Denver, the aircraft's weight at that second decision point and the amount of fuel still remaining. The resulting driftdown plan will also indicate that prior to reaching the second decision point, the first alternate (Grand Junction, Colo.) is the recommended landing site. After the aircraft has proceeded beyond that second decision point, however, the computer determines that Albuquerque, N.M. (ABQ) would be an acceptable landing site. As before, the distance to that site, its heading relative to the second decision point plus other data are printed out as a part of the driftdown plan.

With continued reference to FIG. 5, when a third decision point is reached, the program determines that the aircraft can no longer safely make it back to Albuquerque while still maintain a minimum safe clearance between the highest terrain in the path from that decision point to Albuquerque. Instead, the computer determines and indicates that following the third decision point, the aircraft can safely drift down to the scheduled destination (TUS).

There may be occasions when one of the alternate sites selected by the computer would be unavailable as a landing site. For example, weather conditions such as fog, heavy snow or the like may dictate that a computer selected alternate may not actually be available for landing. In this event, as reflected by decision block 70 in FIG. 4(*b*), the operator (usually the flight dispatcher) can enter in a three letter city code as a proposed destination and have the computer determine, based upon the aircraft design and the terrain conditions, whether that operator selected alternate site is viable. For example, if the computer had determined that Grand Junction Colo. was to be a first alternate landing site based upon the first decision point, but that weather condition at Grand Junction precluded the safe landing of an aircraft at that airport, the operator might type in as a proposed alternate Alamosa, Colo. (ALS). The computer would then run through the program already described and would determine whether Alamosa would be in range and whether the aircraft could clear all terrain from the first decision point into Alamosa by a minimum safe clearance distance in the event of driftdown occasion by the loss of an engine.

Reproduced below is an example of a print-out of a driftdown plan for a flight from Denver, Colo. to Tucson, Ariz. produced in accordance with the method of the present invention.

| IDENTIFIERS | LATITUDE | LONGITUDE | DISTANCE | HEADING | LOCATION |
| --- | --- | --- | --- | --- | --- |
| DEN | 39.768 | 104.869 | .000 | .000 | DENVER, COLORADO |
| TUS | 32.117 | 110.936 | 557.015 | 218.412 | TUCSON, ARIZONA |

ENGINES: −7
CRUISE ALTITUDE: 31 THOUSAND FEET
WEIGHT AT TOC: 110000.0 LBS.
DISTANCE TO TOC: 90.0 NAUTICAL MILES
FUEL REMAINING AT TOC: 18000.0 LBS.
DECISION POINT N 37. 50.′ 41.″ W 106. 23.′ 37.″
APPROXIMATELY 140 NAUTICAL MILES ALONG ROUTE
WEIGHT AT DECISION POINT: 109340.0
FUEL REMAINING: 17340.0
PRIOR TO DECISION POINT: RETURN TO DEN   DENVER, COLO.
AFTER DECISION POINT: GJT   GRAND JUNCTION, COLO.
DISTANCE: 129.5 NAUTICAL MILES
HEADING: 300.8 DEGREES (TRUE NORTH)
WEIGHT: 107948.8 LBS.
FUEL REMAINING: 15948.8 LBS.
BOTTOM OF DRIFTDOWN (ALTITUDE FT.): 11,524.0
DECISION POINT N 37. 42.′ 26.″ W 106. 30.′ 9.″
APPROXIMATELY 150 NAUTICAL MILES ALONG ROUTE
WEIGHT AT DECISION POINT: 109208.0
FUEL REMAINING: 17208.0
PRIOR TO DECISION POINT: ALS   ALAMOSA, COLO.

```
-continued
DISTANCE: 36.0 NAUTICAL MILES
HEADING: 300.8 DEGREES (TRUE NORTH)
WEIGHT: 108979.6 LBS.
FUEL REMAINING: 16979.6 LBS.
BOTTOM OF DRIFTDOWN (ALTITUDE FT.): 23874.8
DECISION POINT N 36. 3.' 32." W 107. 48.' 34."
APPROXIMATELY 270 NAUTICAL MILES ALONG ROUTE
WEIGHT AT DECISION POINT: 107624.0
FUEL REMAINING: 15624.0
PRIOR TO DECISION POINT: ALS   ALAMOSA, COLO.
DISTANCE: 118.9 NAUTICAL MILES
HEADING: 56.2 DEGREES (TRUE NORTH)
WEIGHT: 106541.6 LBS.
FUEL REMAINING: 14541.6 LBS.
AFTER DECISION POINT: ABQ   ALBUQUERQUE, N.M.
DISTANCE: 87.6 NAUTICAL MILES
HEADING: 130.3 DEGREES (TRUE NORTH)
WEIGHT: 106784.4 LBS.
FUEL REMAINING: 14784.4 LBS.
BOTTOM OF DRIFTDOWN (ALTITUDE FT.): 15811.4
DECISION POINT N 34. 16' 24." W 109. 13'. 32"
APPROXIMATELY 400 NAUTICAL MILES ALONG ROUTE
WEIGHT AT DECISION POINT: 105920.0
FUEL REMAINING: 13920.0
PRIOR TO DECISION POINT: ABQ   ALBUQUERQUE, N.M.
DISTANCE: 133.2 NAUTICAL MILES
HEADING: 76.1 DEGREES (TRUE NORTH)
WEIGHT: 104500.5 LBS.
FUEL REMAINING: 12500.5 LBS.
AFTER DECISION POINT: TUS   TUSCON, ARIZ
DISTANCE: 159.6 NAUTICAL MILES
HEADING: 218.4 DEGREES (TRUE NORTH)
WEIGHT: 103797.1
FUEL REMAINING: 11797.1
```

This invention has been described herein in considerably detail, in order to comply with the Patent Statutes and to provide those skilled in the art with information needed to apply the novel principles, and to implement the invention. However, it is to be understood that the method comprising the present invention can be carried out by specifically different steps or by rearranging the disclosed steps so as to function in a slightly different sequence. Those various modifications are deemed to be within the true spirit and scope of the invention.

What is claimed is:

1. A method for preparing driftdown plans for aircraft, comprising the steps of:
   (a) developing a first data base defining the height above sea level of terrain at predetermined geographic coordinate locations;
   (b) storing said first data base in the memory of a digital computer, each height value entry in said data base being at a predetermined addressable location in said memory;
   (c) developing a second data base defining driftdown flight performance characteristics of a variety of multi-engine aircrafts upon the loss of power of at least one of said engines for a variety of engine types;
   (d) storing said second data base in said memory of said digital computer;
   (e) entering flight specification data, including the type of aircraft, the type of engine on said aircraft, the load factor of the aircraft and the geographic location of a flight origin and a flight destination for a proposed route into said computer;
   (f) executing a program of instructions in said computer for comparing terrain height information in said first data base related to the routing of the aircraft between said origin and said destination to driftdown altitude in said flight performance characteristics along said proposed route in said second data base; and
   (g) providing a visual manifestation based on the result of the comparison of alternate landing sites which the aircraft would be capable of reaching, while maintaining a predetermined safe clearance distance above the terrain, in the event the loss of power of at least one engine at predetermined, spaced points along said proposed route.

2. The method for preparing driftdown plans for aircraft as in claim 1 wherein said addressable locations in said memory storing said first data base are addressed as a function of geographic information.

3. The method for preparing driftdown plans for aircraft as in claim 2 wherein said geographic information comprises the longitude and latitude coordinates of predetermined areas of the earth's surface.

4. The method for preparing driftdown plans for aircraft as in claim 1 and further including the steps of:
   (a) entering into said computer data relating to wind conditions at said predetermined point;
   (b) computing from the data contained in said second data base the amount of fuel remaining;
   (c) calculating the range of the aircraft based upon said wind conditions and the amount of fuel remaining; and
   (d) determining whether a manually entered proposed landing site is within said range of the aircraft.

* * * * *